United States Patent
Maehara et al.

(10) Patent No.: US 6,498,963 B1
(45) Date of Patent: Dec. 24, 2002

(54) NUMERICAL CONTROL UNIT

(75) Inventors: Hiroyuki Maehara, Shizuoka-ken (JP); Kunihiko Noda, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,443

(22) Filed: Dec. 6, 1999

(30) Foreign Application Priority Data

Dec. 9, 1998 (JP) .......................................... 10-368494

(51) Int. Cl.[7] .............................................. G06F 19/00
(52) U.S. Cl. ........................................ 700/180; 341/22
(58) Field of Search ................................ 700/180, 181, 700/184, 95, 83; 341/22–34, 9

(56) References Cited

U.S. PATENT DOCUMENTS

| | | | | |
|---|---|---|---|---|
| 4,486,741 A | * | 12/1984 | Nozawa et al. | 341/22 |
| 4,530,046 A | * | 7/1985 | Munekata et al. | 700/86 |
| 4,616,309 A | * | 10/1986 | Fujimoto et al. | 700/56 |
| 5,007,008 A | * | 4/1991 | Beers | 708/145 |
| 5,400,021 A | * | 3/1995 | Kokura | 341/27 |
| 5,574,447 A | * | 11/1996 | Roylance | 341/22 |

FOREIGN PATENT DOCUMENTS

JP          10-133724          5/1998

* cited by examiner

*Primary Examiner*—Leo Picard
*Assistant Examiner*—Zoila Cabrera
(74) *Attorney, Agent, or Firm*—Pillsbury Winthrop LLP

(57) ABSTRACT

This invention is a numerical control unit including a main controller for carrying out a numerical controlling step and a personal computer connected to the main controller through a bus-line. An operating panel includes a keyboard having keys. A key-encoder is connected to the main controller, the personal computer and the keyboard for assigning the keys of the keyboard as key or keys for the main controller or as a key or keys for the personal computer respectively. The numerical control unit can freely assign the keys of the keyboard in the operating panel as the key or keys for the main controller or as the key or keys for the personal computer respectively. Thus, the operating panel suitable to operate can be achieved effectively and efficiently.

5 Claims, 4 Drawing Sheets

NUMERICAL CONTROL UNIT

BACKGROUND OF THE INVENTION

1. Field of the Invention

This invention relates to a numerical control unit including a main controller, a personal computer and an operating panel for controlling a machine, in particular, to a numerical control unit capable of freely changing a key assignment of the operating panel.

2. Description of the Related Art

The Japanese Patent Laid-Open publication No. 133724/1998 discloses a conventional operating panel for a numerical control unit including a main controller and a personal computer.

FIG. 4 is a block diagram for showing a construction of a conventional operating panel 1 for a numerical control unit 11 including a personal computer 5. A key inputting interface 3 is arranged in the operating panel 1. Keys for personal computer 2 are also provided on the operating panel 1. The keys for personal computer 2 are connected to the personal computer 5 through the key inputting interface 3 and a line 4. Thus, the keys for personal computer 2 are capable of transmitting inputted key information to the personal computer 5. The numerical control unit 11 also includes a main controller 8 consisting of a CPU, a memory and so on.

The main controller 8 is adapted to carry out a supplemental controlling step. Keys for main controller 6 are also provided on the operating panel 1. The keys for main controller 6 are connected to the main controller 8 through a parallel line 7. The personal computer 5 and the main controller 8 are connected with each other through a bus-line 9. The main controller 8 is connected to an actuator 10.

However, the conventional operating panel 1 for the numerical control unit 11 including the personal computer 5 has some problems. Especially, the key inputting interface 3 in the operating panel 1 has some problems.

For example, in the numerical control unit 11, position data and diagnosis data are stored in the main controller 8. Thus, keys for causing the personal computer 5 to display the data stored in the main controller 8 are not included in the keys for personal computer 2. Therefore, it is difficult for the personal computer 5 to display the position data and the diagnosis data, based on an interactive man-machine operating.

In the case, key information for controlling the main controller 8 has to be inputted by a combination of some of the keys for personal computer 2. Furthermore, the key information for controlling the main controller 8 has to be processed by a software in the personal computer 5. Then, the processed key information for controlling the main controller 8 is transmitted to the main controller 8 via the bus-line 9.

Alternatively, a new key interface has to be added to the keys for main controller 6 in order to input the key information for controlling the main controller 8. That is, the hardware has to be changed.

The software in the personal computer 5 to process the key information has to be arranged for each desired operation. The arrangements are troublesome and cost so much.

In addition, it is also troublesome and costs so much to add the new key interface to the keys for main controller 6.

Furthermore, it is difficult to provide another new key on the operating panel 1 because the key assignment of the operating panel 1 is unchangeable.

SUMMARY OF THE INVENTION

Therefore, the object of this invention is to provide a numerical control unit including a main controller and a personal computer, which can freely assign keys of a keyboard (an operating panel) as key or keys for the main controller or as a key or keys for the personal computer respectively, and which can transmit key information inputted by the keyboard to the main controller or the personal computer without arranging a software in the personal computer and without adding a new key interface.

To achieve the above object, this invention is characterized by following features. That is, this invention is a numerical control unit including: a main controller for carrying out a numerical controlling step, a personal computer connected to the main controller through a bus-line, an operating panel including a keyboard having keys, and a key-encoder connected to the main controller, the personal computer and the keyboard for assigning the keys of the keyboard as key or keys for the main controller or as a key or keys for the personal computer respectively.

The numerical control unit may have an actuator connected to the main controller. In the case, preferably, the numerical controlling step may be carried out for the actuator by the main controller.

Preferably, the key-encoder has: a key reading part for reading a key information inputted from the keyboard, a code discriminating part for judging whether the key information has been assigned as a key for the main controller or as a key for the personal computer, on the basis of a predetermined key assignment which defines a relationship between the key information and the key for the main controller or the key for the personal computer, a main controller key interface for sending the key information to the main controller when the code discriminating part judges the key information has been assigned as the key for the main controller, and a personal computer key interface for sending the key information to the personal computer when the code discriminating part judges the key information has been assigned as the key for the personal computer.

In the case, preferably, the code discriminating part is capable of changing the predetermined key assignment.

In addition, preferably, the main controller has a position information and a diagnosis information, and the personal computer is capable of displaying the position information and the diagnosis information.

In addition, preferably, the main controller has a CPU and a memory to carry out a supplemental controlling step.

BEST MODE FOR CARRYING OUT THE INVENTION

An embodiment of the invention will now be described in more detail with reference to FIGS. 1 to 3.

Figure 1:
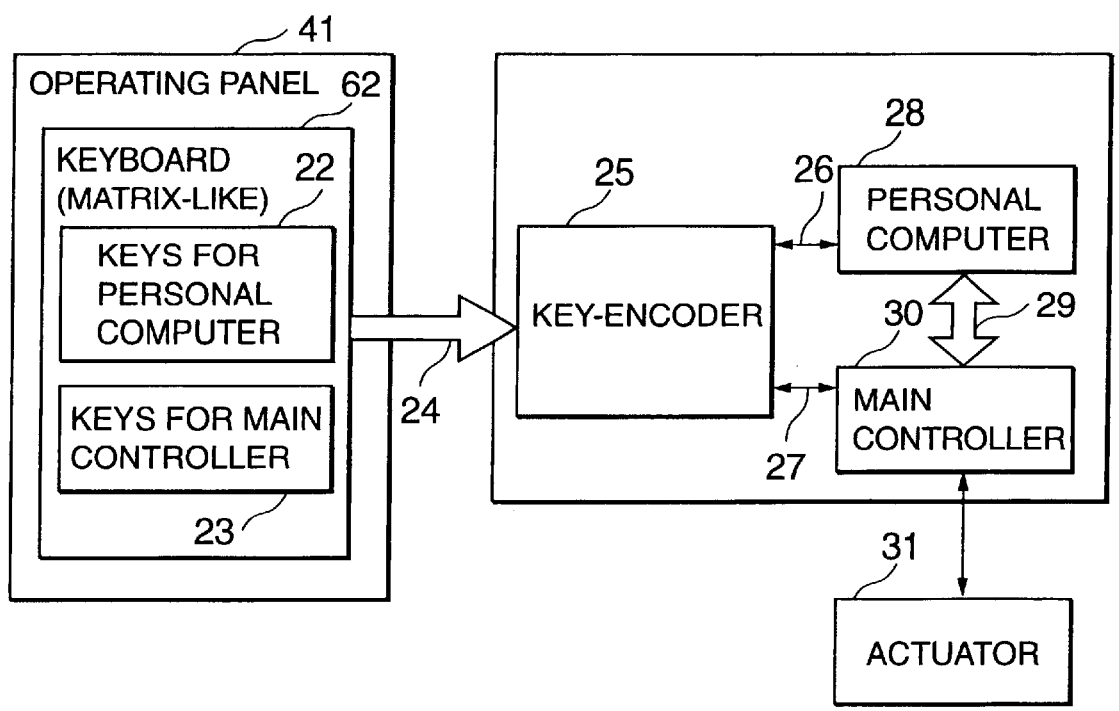
FIG. 1 is a block diagram of an embodiment of the numerical control unit according to the invention.
Figure 2:
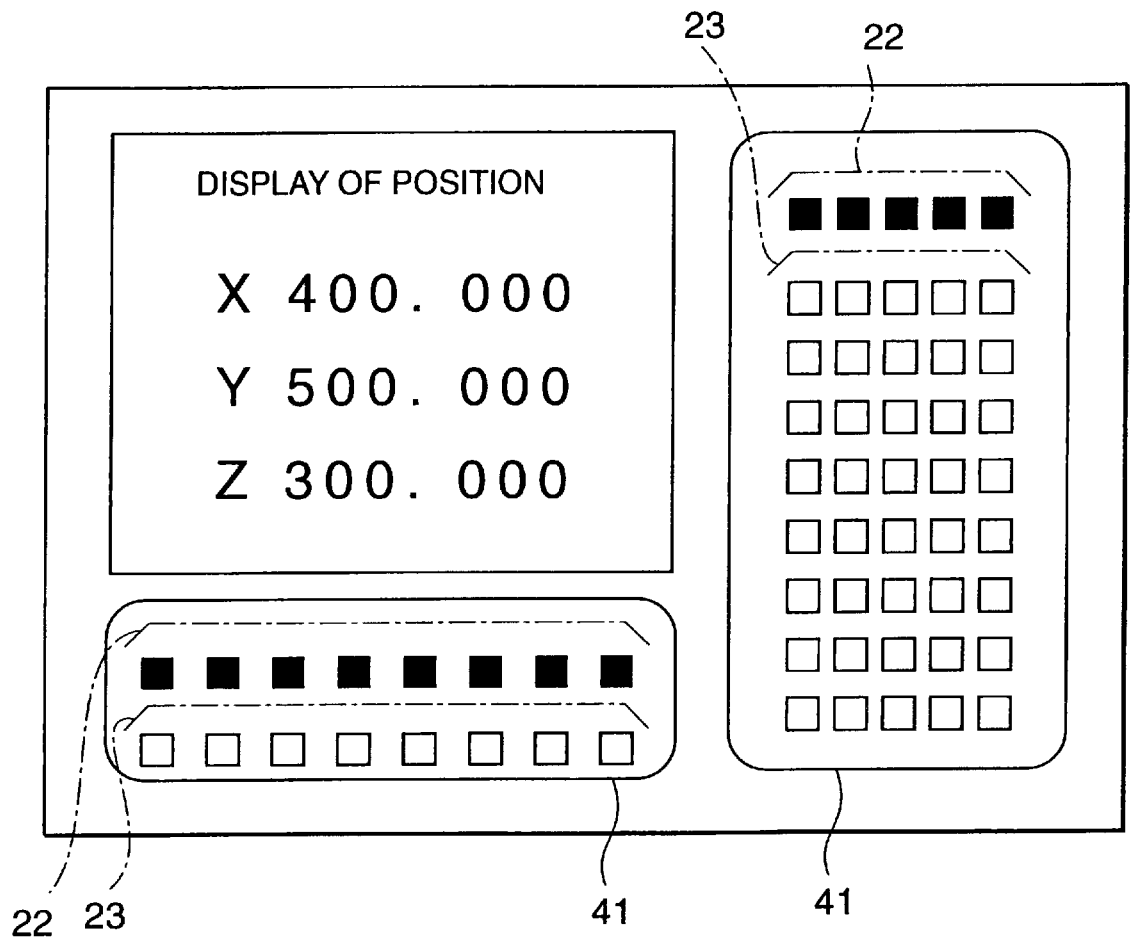
FIG. 2 is a front view of the operating panel of the embodiment of the numerical control unit according to the invention.

FIG. 1 is a block diagram of an embodiment of the numerical control unit according to the invention. As shown in FIG. 1, an operating panel 41 includes a keyboard 62 having keys which are arranged matrix-like and divided into two groups. One group of the keys is assigned as keys for main controller 23. The other group of the keys is assigned as keys for personal computer 22.

A signal from each of the keys on the operating panel 41 is transmitted to a key-encoder 25 through a line 24. The key encoder 25 and a personal computer 28 are connected with each other through a line 26. The key encoder 25 and a main controller 30 are connected with each other through a line 27. The personal computer 28 and the main controller 30 are connected with each other through a bus-line 29. The main controller 30 is connected to an actuator 31 such as a motor, a positional detector and an electromagnetic valve.

General interactive man-machine operatings include: inputting of a G code, an M code, an F code, a request of a shaft movement (for example, X100Y200Z300) and so on; positioning; programming; program editing; diagnosing; data processing; revising; referring to help messages; resetting a command or commands; clearing all; and so on. The above commands (requests) can be inputted from the keys on the operating panel 41. Thus, for example, when a key assigned for a position key is operated, the position is displayed on a screen. Similarly, when a key assigned for a diagnosis key is operated, the diagnosis is displayed on the screen.

The above commands are transmitted to the main controller 30. Therefore, both of the key as the position key and the key as the diagnosis key are belonging to the group of keys for main controller 23. The above commands can not be inputted from the keys for personal computer 22. Even if a new key is assigned as a new command key, the key is necessary to belong to the group of keys for main controller 23.

Figure 3:
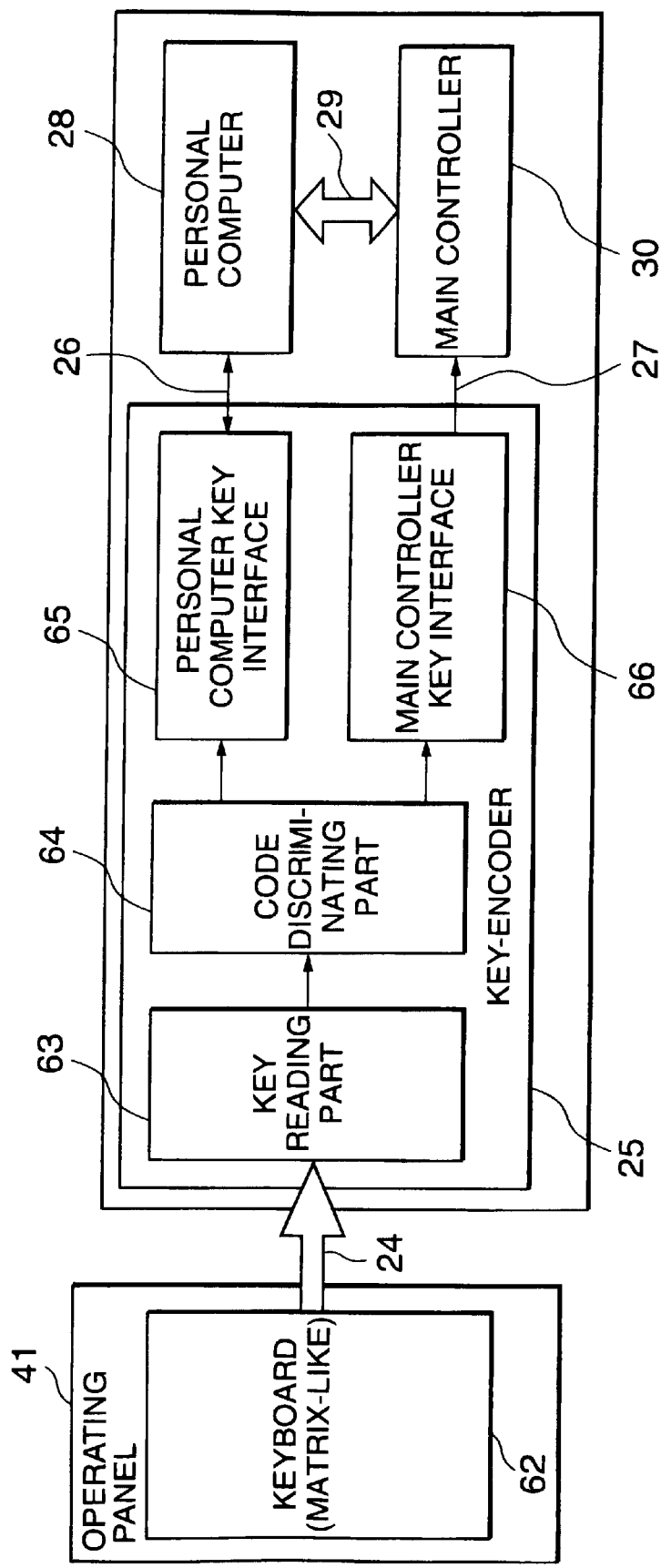
FIG. 3 is a block diagram for showing a flow of key data.
Figure 4:
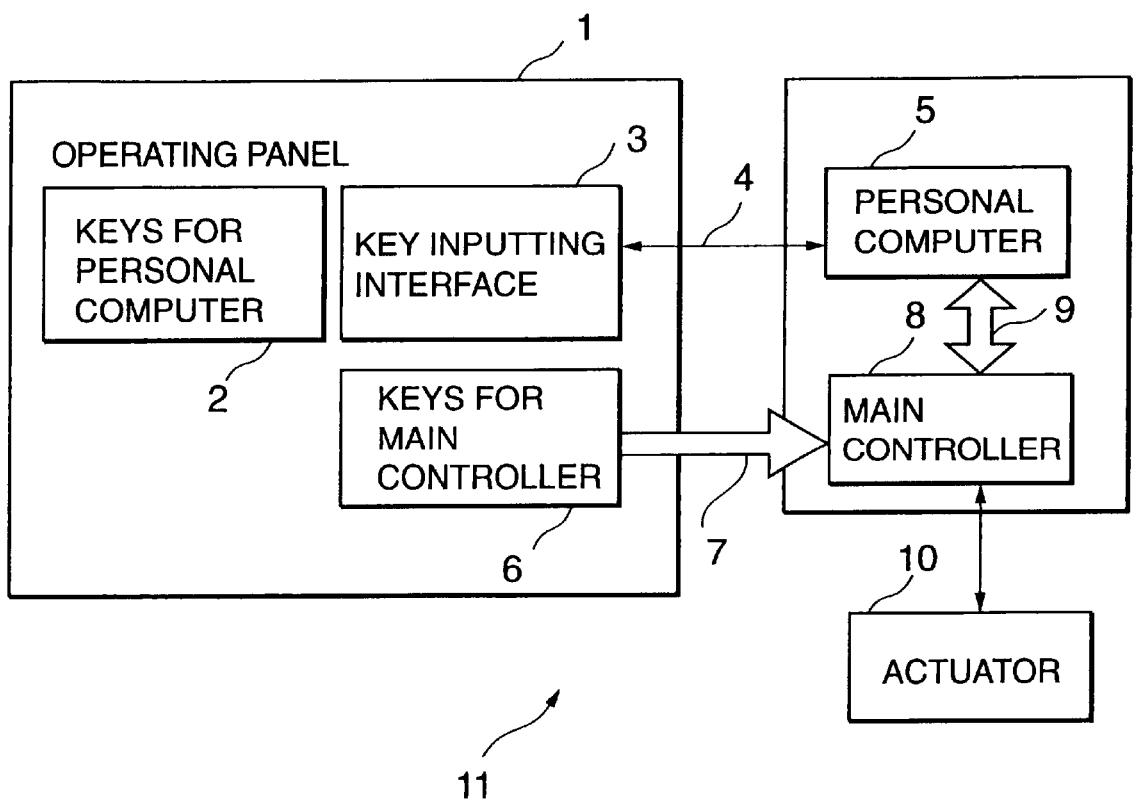
FIG. 4 is a block diagram of a conventional numerical control unit.

FIG. 3 is a block diagram for showing a flow of key data inputted from a key matrix (keyboard) 62 of the operating panel 41. The key matrix serves as a circuit to generate key positional information when a key or keys are pushed. When the keys 22, 23 are pushed, the key positional information is transmitted to a key recording part 63 of the key encoder 25 through the line 24. The key recording part 63 reads the key positional information and transmits it to a code discriminating part 64. The code discriminating part 64 judges whether the pushed key has been assigned as a key for the main controller or as a key for the personal computer, on the basis of the key positional information. When the pushed key is judged as the key for the main controller, a main controller key interface 66 converts the key information into codes which can be read by the main controller 30. Then, The main controller key interface 66 sends the codes to the main controller 30 through the line 27. When the pushed key is judged as the key for the personal computer, a personal computer key interface 65 converts the key information into codes which can be read by the personal computer 28. Then, the personal computer key interface 65 sends the codes to the personal computer 28 through the lime 26.

The key assignment in the code discriminating part 64 of the key encoder 25 defines a relationship between the key positional information and the keys (codes) for the main controller or the keys (codes) for the personal computer. Thus, the layout of the keys 22, 23 on the operating panel 41 can be changed by changing the key assignment without changing the hardware (key interface) of the unit.

According to this invention, the numerical control unit can freely assign the keys of the keyboard in the operating panel as the key or keys for the main controller or as the key or keys for the personal computer respectively. Thus, the operating panel suitable to operate can be achieved effectively and efficiently. In addition, the numerical unit can transmit the key information inputted by the keyboard to the main controller or the personal computer without arranging any software in the personal computer and without adding a new key interface. Furthermore, the key assignment can be changed without changing the hardware (key interface) of the unit. Thus, the key inputting interface can be simplified, and the cost thereof can be reduced.

What is claimed is:

1. A numerical control unit, comprising;
    a main controller for carrying out a numerical controlling step,
    a personal computer connected to the main controller through a bus-line,
    an operating panel including a keyboard having keys, and
    a key-encoder connected to the main controller, the personal computer and the keyboard for assigning the keys of the keyboard as key or keys for the main controller or as a key or keys for the personal computer respectively,
    wherein the key-encoder has:
    a key reading part for reading key information inputted from the keyboard,
    a code discriminating part for judging whether the key information has been assigned as a key for the main controller or as a key for the personal computer, on the basis of a predetermined key assignment which defines a relationship between the key information and the key for the main controller or the key for the personal computer,
    a main controller key interface for sending the key information to the main controller when the code discriminating part judges the key information has been assigned as the key for the main controller, and
    a personal computer key interface for sending the key information to the personal computer when the code discriminating part judges the key information has been assigned as the key for the personal computer.

2. A numerical control unit according to the claim 1 further comprising an actuator connected to the main controller, wherein:
    the numerical controlling step is carried out for the actuator by the main controller.

3. A numerical control unit according to the claim 1, wherein:
    the code discriminating part is capable of changing the predetermined key assignment.

4. A numerical control according to claim 1, wherein:
    the main controller has a position information and a diagnosis information, and
    the personal computer is capable of displaying the position information and the diagnosis information.

5. A numerical control according to claim 1, wherein:
    the main controller has a CPU and a memory to carry out a supplemental controlling step.

* * * * *